United States Patent
DeSanti (10) Patent No.: US 9,407,547 B2
(45) Date of Patent: Aug. 2, 2016

(54) FIBRE CHANNEL OVER ETHERNET (FCOE) OVER VIRTUAL PORT CHANNEL (VPC)

(71) Applicant: CISCO TECHNOLOGY, INC., San Jose, CA (US)

(72) Inventor: Claudio DeSanti, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 14/106,471

(22) Filed: Dec. 13, 2013

(65) Prior Publication Data

US 2015/0172184 A1    Jun. 18, 2015

(51) Int. Cl.
*H04L 12/28* (2006.01)
*H04L 12/66* (2006.01)
*H04L 12/721* (2013.01)
*H04L 12/931* (2013.01)
*H04L 12/947* (2013.01)

(52) U.S. Cl.
CPC ............. *H04L 45/72* (2013.01); *H04L 49/25* (2013.01); *H04L 49/354* (2013.01)

(58) Field of Classification Search
CPC ............................. H04L 12/28; H04L 12/66
See application file for complete search history.

(56) References Cited

U.S. PATENT DOCUMENTS

| 7,095,738 | B1 | 8/2006 | Desanti |
| 7,333,612 | B2 | 2/2008 | Maino et al. |
| 7,367,052 | B1 | 4/2008 | Desanti |
| 7,443,845 | B2 | 10/2008 | Gai et al. |
| 7,492,765 | B2 | 2/2009 | Edsall et al. |
| 7,512,123 | B1 | 3/2009 | Desanti et al. |
| 7,602,781 | B2 | 10/2009 | Desanti |
| 7,606,167 | B1 | 10/2009 | Di Benedetto et al. |
| 7,609,689 | B1 | 10/2009 | Desanti et al. |
| 7,656,884 | B1 | 2/2010 | Desanti |
| 7,657,821 | B1 | 2/2010 | Wakerly et al. |
| 7,734,808 | B1 | 6/2010 | Bergamasco et al. |
| 7,808,924 | B2 | 10/2010 | Di Benedetto et al. |
| 7,821,969 | B2 | 10/2010 | Di Benedetto et al. |
| 7,844,056 | B1 | 11/2010 | Desanti et al. |
| 7,912,052 | B2 | 3/2011 | Desanti et al. |
| 7,965,843 | B1 | 6/2011 | Maino et al. |
| 8,098,595 | B2 | 1/2012 | Di Benedetto et al. |
| 8,107,499 | B2 | 1/2012 | Huang et al. |
| 8,151,318 | B1 | 4/2012 | Desanti et al. |
| 8,208,479 | B1 | 6/2012 | Desanti |
| 8,238,347 | B2 | 8/2012 | Desanti et al. |
| 8,243,746 | B2 | 8/2012 | Di Benedetto |
| 8,264,985 | B2 | 9/2012 | Desanti |
| 8,321,908 | B2 | 11/2012 | Desanti et al. |
| 8,351,442 | B1 * | 1/2013 | McGlaughlin ............... 370/401 |
| 8,514,856 | B1 | 8/2013 | Gai et al. |
| 8,621,095 | B1 | 12/2013 | Desanti |
| 8,948,176 | B1 * | 2/2015 | Desanti ............... H04L 45/44 370/351 |
| 2008/0095367 | A1 | 4/2008 | Maino et al. |
| 2008/0165783 | A1 | 7/2008 | Desanti |
| 2009/0037977 | A1 * | 2/2009 | Gai et al. ........................ 726/1 |

(Continued)

*Primary Examiner* — Brandon Renner
(74) *Attorney, Agent, or Firm* — Cindy Kaplan (57) ABSTRACT

In one embodiment, a method includes instantiating a virtual Fiber Channel over Ethernet (FCoE) Forwarder (FCF) at a primary FCF, the virtual FCF associated with a virtual domain identifier and a virtual FCF-MAC (Media Access Control) address, wherein the primary FCF and a secondary FCF form a virtual Port Channel (vPC) for communication with a host, and allocating node port identifiers to virtual node ports on vPC ports at the host from the virtual domain identifier. An apparatus and logic are also disclosed herein.

20 Claims, 7 Drawing Sheets

(56) References Cited

U.S. PATENT DOCUMENTS

| | | |
|---|---|---|
| 2009/0252181 A1 | 10/2009 | Desanti |
| 2009/0254677 A1 | 10/2009 | Desanti |
| 2011/0219438 A1 | 9/2011 | Maino et al. |
| 2011/0264779 A1 | 10/2011 | Noll et al. |
| 2011/0274114 A1* | 11/2011 | Dhar et al. .................. 370/401 |
| 2012/0254554 A1* | 10/2012 | Nakajima ............ G06F 3/0607 711/154 |
| 2013/0028135 A1* | 1/2013 | Berman ........................ 370/254 |
| 2013/0086266 A1 | 4/2013 | Gai et al. |
| 2013/0329743 A1 | 12/2013 | Gai et al. |
| 2015/0071288 A1* | 3/2015 | Ayandeh ............... H04L 49/357 370/392 |

* cited by examiner

FIBRE CHANNEL OVER ETHERNET (FCOE) OVER VIRTUAL PORT CHANNEL (VPC)

TECHNICAL FIELD

The present disclosure relates generally to communication networks, and more particularly, to Fibre Channel over Ethernet (FCoE) over virtual Port Channel (vPC).

BACKGROUND

Fibre Channel over Ethernet (FCoE) is a protocol that leverages Ethernet extensions that enable the establishment of lossless connections between Ethernet nodes. A virtual Port Channel (vPC) allows links that are physically connected to two different network devices to appear as a single port-channel to a third network device.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises instantiating a virtual Fibre Channel over Ethernet (FCoE) Forwarder (FCF) at a primary FCF, the virtual FCF associated with a virtual domain identifier and a virtual FCF-MAC (Media Access Control) address, wherein the primary FCF and a secondary FCF form a virtual Port Channel (vPC) for communication with a host, and allocating node port identifiers to virtual node ports on vPC ports at the host from the virtual domain identifier.

In another embodiment, an apparatus generally comprises a processor for instantiating a virtual Fibre Channel over Ethernet (FCoE) Forwarder (FCF) at a primary FCF, the virtual FCF associated with a virtual domain identifier and a virtual FCF-MAC (Media Access Control) address, the primary FCF configured to form a virtual Port Channel (vPC) with a secondary FCF for communication with a host, and allocating node port identifiers to virtual node ports on vPC ports at the host from the virtual domain identifier. The apparatus further comprises memory for storing the identifiers.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

With FCoE (Fibre Channel over Ethernet), native FC (Fibre Channel) frames are encapsulated in Ethernet frames so that Ethernet can become the physical layer of an FC based Storage Area Network (SAN). At an Ethernet receiving node, the native FC frames are decapsulated from the Ethernet frames and processed in accordance with the FC protocol. By deploying lossless capability in Ethernet, FC can be extended to Ethernet-capable network devices, thereby increasing the reach of FC connected devices. One of the components that enables FCoE is referred to as an FCoE Forwarder (FCF). The FCF forwards FCoE frames in accordance with the FC protocol and is functionally equivalent to a native FC switch. The FCF may support both Ethernet interfaces and native FC interfaces.

Figure 1A:
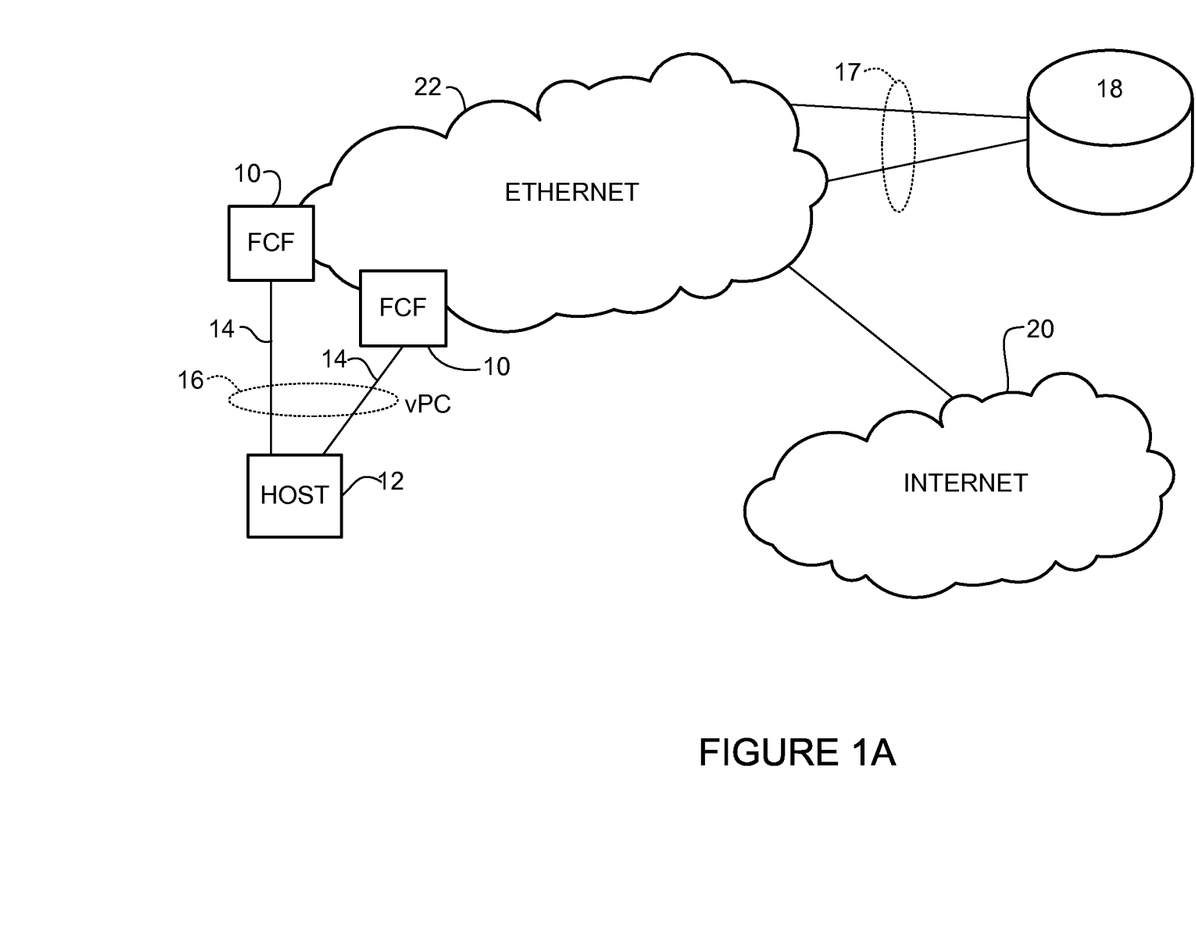
FIG. 1A illustrates an example of a network in which embodiments described herein may be implemented.

In communication networks various redundancy mechanisms provide resilient interconnection of nodes. For example, multiple links may exist between network devices, with one or more of the links configured as an active link while the remaining links are standby links. In some cases, it may be beneficial to aggregate the physical links into logical links, which provide higher aggregate bandwidth, load balancing, and link redundancy. An aggregation of physical links between a host and a network device into a single logical link is referred to herein as a Port Channel. A Port Channel provides resiliency against link failures, but not against failures of the network device. An aggregation of physical links between a host and two network devices into a single logical link, as seen from the host, is referred to herein as a virtual Port Channel (vPC). A virtual Port Channel provides resiliency against link failures and against failures of one network device. Therefore, a vPC is the network configuration of choice in environments that require high availability. The term 'virtual Port Channel' or 'vPC' as used herein refers to any logical group of physical links connected to two or more network devices or interfaces coupled to the physical links. A vPC is illustrated in FIG. 1A and described further below.

When two switches of a vPC operate also at layer 3 (e.g., IP (Internet Protocol) routers or FCFs), they need to emulate a virtual layer 3 device. In IP, this is straight forward, because IP addresses are assigned per-subnet, therefore the virtual router MAC (Media Access Control) address/IP address pair can 'float' between two physical switches if one of them is subject to a failure.

The Fibre Channel addressing model differs from IP because addresses are associated to FC switches/FCFs rather than to subnets (i.e., each FCF gets its own Domain_ID to be used for all of its links). Assigning N_Port_IDs to ENodes in a vPC from a Domain_ID associated with a physical FCF does not allow resiliency since a failure of that FCF would result in the ENode having to rely on the other physical FCF, and this implies an N_Port_ID reassignment, which is disruptive.

The embodiments described herein provide a virtual FCF, associated with a virtual FCF-MAC and a virtual Domain_ID, in order to make stable (i.e., independent from the particular FCF that assigns them), the Fibre Channel N_Port_IDs used over the vPC ports. This allows for implementation of FCoE over vPC.

The embodiments operate in the context of a Fibre Channel over Ethernet (FCoE) network. The following provides a brief description of an FCoE network and associated terminology, before referring to example embodiments.

In a Fibre Channel network, FC ports of FC nodes are designated as N_Ports (Node Ports). The N_Port is an end node port on the Fibre Channel fabric. The port may be a Host Bus Adapter (HBA) in a server or a target port on a storage array, for example. FC ports of FC switches are designated as F_Ports (Fabric Ports connected to N_Ports) or E_Ports (Expansion Ports connecting two switches). In the FCoE network, these constructs become virtual, because ports of ENodes and FCFs are Ethernet ports. Thus, the ports facing ENodes at the FCF are VF_Ports (virtual F_Ports), the ports at the ENodes are VN_Ports (virtual N_Ports), and ports between FCFs are VE_Ports (virtual E_Ports).

The ENode is an FC node that is able to transmit and receive FCoE frames using one or more ENode MACs. ENodes are the combination of FCoE termination functions and Fibre Channel stack on one or more Ethernet MACs, and in that sense are equivalent to host bus adapters (HBAs) in native FC networks. The FCF is the combination of FCoE termination functions and Fibre Channel switching functions on one or more Ethernet MACs, and is therefore equivalent to an FC switch in native FC networks. An FCF may also contain an Ethernet switching function (dual-stack switch).

Referring now to the drawings, and first to FIG. 1A, a network in which embodiments described herein may be implemented is shown. For simplification, only a small number of nodes are shown. In the example shown in FIG. 1A, two FCFs 10 are in communication with a host (end point) 12 over links 14. The host 12 may comprise, for example, a server or group of servers (e.g., blade chassis, rack mounted). The physical links 14 form a single logical channel referred to herein as a virtual Port Channel (vPC) 16. Multiple links 14 may be active at the same time (i.e., active-active topology) to provide increased bandwidth, or the links may be used for redundancy, to provide resiliency and ensure high availability, for example. The links 14 shown in FIG. 1A between the FCFs 10 and host 12 may comprise any number of physical links. The FCFs 10 may be in communication with any number of hosts 12 via any number of virtual Port Channels 16.

In the example shown in FIG. 1A, the FCFs 10 are in communication with storage 18 and a network (e.g., Internet) 20 over an Ethernet network (e.g., Unified Fabric) 22. Storage 18 may include any number of storage devices such as disk arrays or other FC storage and may be connected to the network through a vPC configuration for high availability reasons (vPC 17). The network 22 may include any number of edge devices or intermediate (core) nodes (e.g., FCFs, switches, access layer devices, aggregation layer devices, or other network devices), which facilitate passage of data within the network.

Figure 1B:
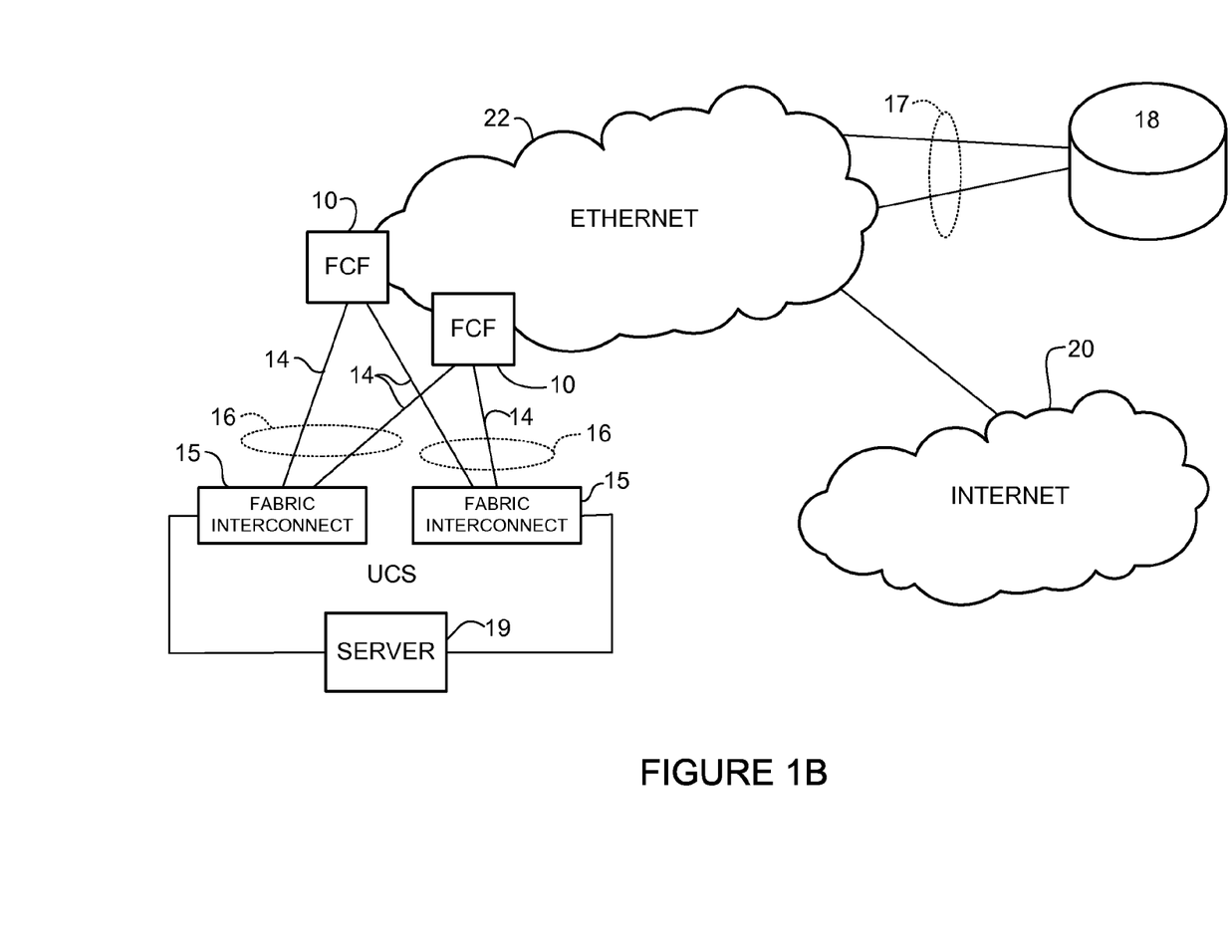
FIG. 1B illustrates another example of a network in which embodiments described herein may be implemented.

There may be any number of network devices (e.g., gateway, router, switches) or other networks interposed between the networks 20 and 22. Other network devices, such as fabric extenders or switches, may also be located between the FCFs 10 and the host 12. Host 12 may be implemented as various combinations of computing elements and other network elements. As an example, host 12 could be a Unified Computing System (UCS), available from Cisco Systems, Inc. of San Jose, Calif. (FIG. 1B). The UCS is composed of two network elements called Fabric Interconnects 15 that interconnect among themselves all the computing elements part of the UCS (including server 19) and present themselves as hosts to a network external to the UCS. In the case of UCS, shown in FIG. 1B, two vPCs 16 are instantiated, one per each of the two Fabric Interconnects 15, with each vPC 16 formed between the FCFs 10 and each of the two Fabric Interconnects.

Referring again to FIG. 1A, the FCFs 10 communicate with the host 12 over an FCoE network. The FCF 10 includes suitable logic, interfaces, code, or circuits operable to encapsulate FC frames into FCoE frames, decapsulate FCoE frames into FC frames, and optionally perform Ethernet switching operations. The FCF 10 is also configured to forward FCoE frames from the host 12 to other hosts. The FCF 10 may be, for example, an access switch (e.g., NEXUS 5000 or NEXUS 6000 switch available from Cisco Systems, Inc. of San Jose, Calif.) or any other network device operable to perform forwarding functions. The FCFs 10 may operate in one or more VLAN (virtual local area network).

Interfaces on the FCFs 10 and host 12 that belong to the vPC 16 are referred to as vPC member ports. As described below with respect to FIG. 2, ports at the FCFs 10 connected to link 14 are VF_Ports and ports at the host 12 connected to link 14 are VN_Ports. The FCFs 10 communicate with one another over a vPC peer link, as described below with respect to FIG. 3. The vPC peer link may be used to synchronize states between the FCFs (vPC peer devices). Periodic keep alive messages may be sent between vPC peer devices to monitor the vPC peer device.

As described in detail below with respect to FIG. 3, a virtual FCF is instantiated by the FCFs 10 participating in the vPC 16. The virtual FCF has a virtual FCF MAC address (FCF-MAC) and a virtual domain identifier (Domain_ID). This allows the Fibre Channel N_Port_IDs used over the vPC ports to be independent from the particular FCF that assigned them, thus providing stable addressing for FCoE over vPC.

It is to be understood that the network shown in FIG. 1A and described above is only an example and that networks having different topologies or network devices may be used without departing from the scope of the embodiments.

Figure 2:
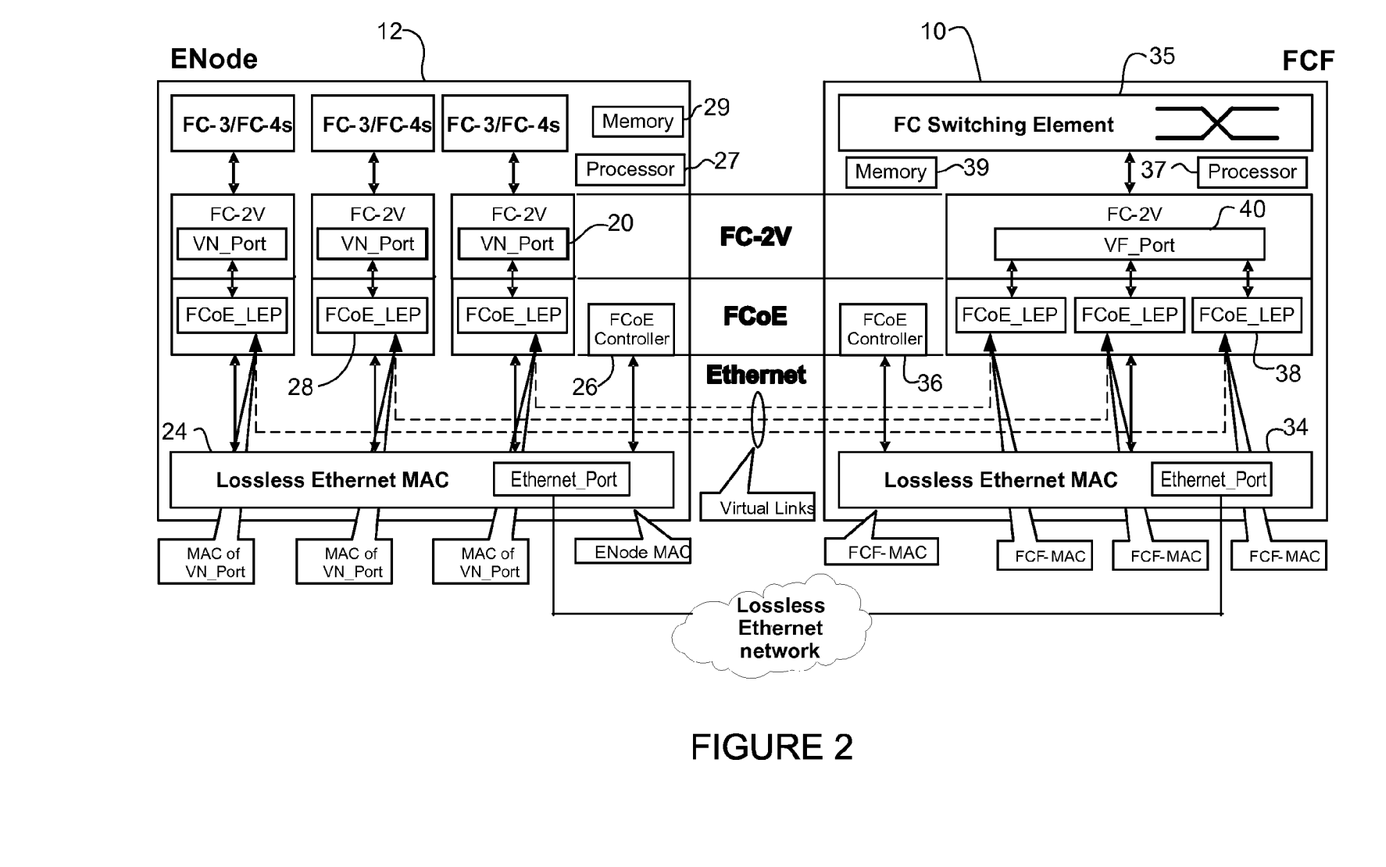
FIG. 2 depicts an example of an ENode and FCF in the network of FIG. 1A or FIG. 1B.

FIG. 2 illustrates an example of a functional model (block diagram) of an ENode (host 12 in FIG. 1A) in communication with an FCF (FCF 10 in FIG. 1A) through VN_Port to VF_Port Virtual Links. The ENode 12 includes at least one lossless Ethernet MAC (ENode MAC) 24 and an FCoE controller 26. The FCoE controller 26 performs an FCoE Initialization Protocol (FIP) and instantiates or de-instantiates VN_Port/FCoE_LEP (Link End-Point) pairs as needed. The model illustrates the Fibre Channel layers (FC-3, FC-4, FC-2V) as described in the FC-BB-5 standard. VN_Port 20 is coupled with one FCoE_LEP (Link End-Point) 28.

The FCoE_LEP 28 is the functional entity performing the encapsulation of FC frames into FCoE frames in transmission and the decapsulation of FCoE frames into FC frames in reception. The FCoE_LEP 28 operates according to the MAC address of the local link end-point and the MAC address of the remote link end-point. When encapsulating FC frames into FCoE frames, the MAC address of the local link end-point is used as a source address and the MAC address of the remote link end-point is used as a destination address of the generated FCoE frame. When decapsulating FC frames from FCoE frames, the FCoE_LEP 28 verifies that the destination address of the received FCoE frame is equal to the MAC address of the local link end-point and that the source address of the received FCoE frame is equal to the MAC address of the remote link end-point. If either of these checks fails, the FCoE frame may be discarded. The ENode 12 includes a processor 27 and memory 29.

Referring now to the FCF 10, the FCF includes at least one lossless Ethernet MAC (FCF-MAC) 34 and an FCoE controller 36. Virtual and non-virtual ports communicate through FC switching element 35. FCoE controller 36 is a functional entity that performs the FCoE Initialization Protocol (FIP) and instantiates or de-instantiates VF_Ports 40, as needed. VF_Port 40 is associated with one or more FCoE_LEPs 38, one per each VN_Port logged into VF_Port 40. FCoE_LEP 38 is the functional entity performing encapsulation of FC frames into FCoE frames in transmission and decapsulation of FCoE frames into FC frames in reception. The FCoE_LEP 38 operates according to the MAC address of the local link end-point and the MAC address of the remote link end-point. When encapsulating FC frames into FCoE frames the MAC address of the local link end-point is used as source address and the MAC address of the remote link end-point is used as destination address of the generated FCoE frame. When decapsulating FC frames from FCoE frames, the FCoE_LEP 38 verifies that the destination address of the received FCoE frame is equal to the MAC address of the local link end-point and verifies that the source address of the received FCoE frame is equal to the MAC address of the remote link end-point. If either check fails the FCoE frame may be discarded.

The FCF 10 may be implemented in hardware, software, or any combination thereof. The FCoE controller 36 and other components of the FCF 10 depicted in FIG. 2 may be implemented using processor 37 and associated memory 39. Memory 39 may be a volatile memory or non-volatile storage, which stores various applications, operating systems, modules, and data for execution and use by the processor 37. For example, memory 39 may be any type of tangible processor readable memory device that is encoded with or stores instructions that can implement the functionality of FCF 10.

Process logic may be embodied in one or more computer readable storage media that is encoded with instructions for execution by processor 37 that, when executed by the processor are operable to cause the processor to perform the functions described herein. For example, the processor 37 may execute codes stored in a computer-readable medium such as memory 39. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

It is to be understood that the FCF 10 and ENode 12 shown in FIG. 2 and described above is only an example and that different configurations of network devices may be used, without departing from the scope of the embodiments. For example, the network device may further include any suitable combination of hardware, software, algorithms, processors, devices, components, or elements operable to facilitate the capabilities described herein.

In the FC addressing model addresses are associated to switches/FCFs. Each FCF gets its own Domain_ID to be used for all of its links. Fibre Channel addresses are dynamically assigned by the switches/FCFs to the end devices. When a Fibre Channel address identifies an end device, the three bytes composing the address have the format <Domain_ID>, <Area_ID>, <Port_ID>. The Domain_ID part of the address identifies the switch/FCF to which the end device is connected, while the combination of Area_ID and Port_ID identifies specifically that end device in the scope of that switch. Each switch performs the forwarding function by looking at the Domain_ID part of the address, and then delivering the FC frame to the switch having that Domain_ID. When a switch receives an FC frame addressed to its Domain_ID, it looks at the Area_ID and Port_ID part of the FC_ID to deliver the FC frame to the appropriate end device. A principal switch in the switching fabric assigns the Domain_IDs to all of the other switches in the fabric. After receiving a Domain_ID, the switch assigns the Area_IDs and Port_IDs for each end device (host or storage device) in its domain.

In one embodiment, one of the FCFs 10 forming the vPC 16 (i.e., the Primary FCF) obtains from the principal switch of the fabric an additional Domain_ID to be used as a virtual Domain_ID. The virtual Domain_ID is not associated with any physical switch, it is associated with the virtual FCF 44 that FCF 10 is instantiating. In addition, that FCF 10 selects a unique MAC address to associate with the virtual FCF 44 and that will be used for all FIP related operations over the vPC (i.e., a virtual FCF-MAC).

Figure 3:
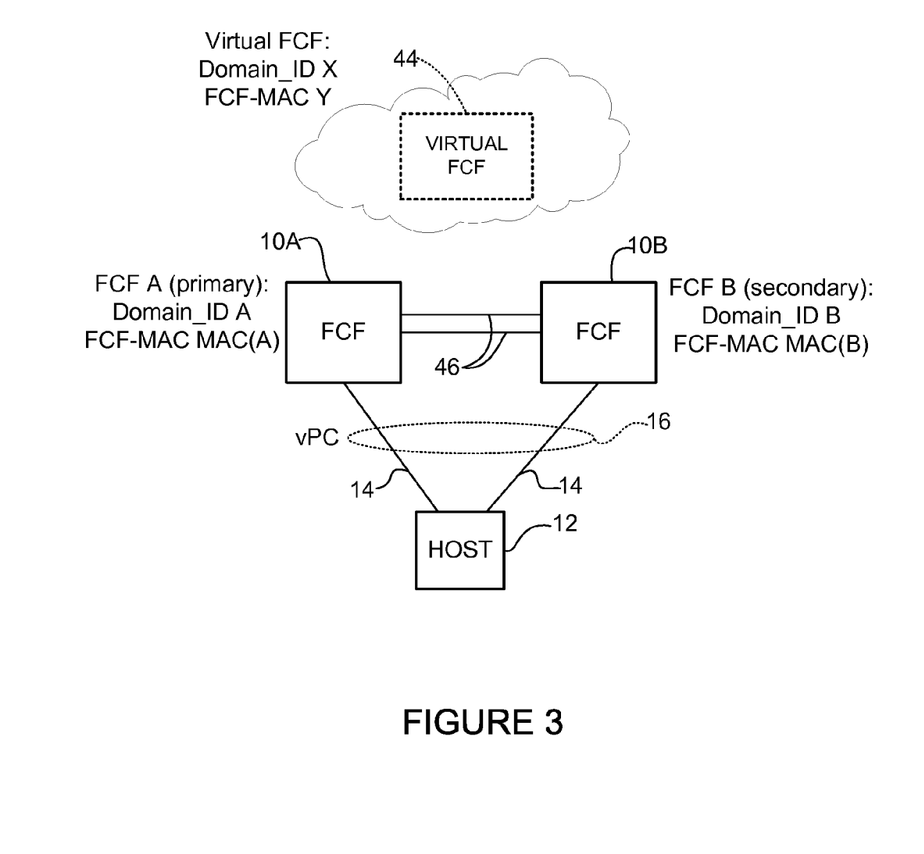
FIG. 3 illustrates a virtual FCF associated with the FCFs in the network of FIG. 1A or FIG. 1B and used to implement FCoE over vPC.

As shown in FIG. 3, a virtual Domain_ID is assigned to a virtual FCF 44. The Primary FCF (e.g., 10A) participating in the vPC 16 instantiates the virtual FCF 44. In the example shown in FIG. 3, the FCFs 10A, 10B have Domain_IDs A and B, and a MAC address (FCF-MAC) MAC(A) and MAC(B) respectively. The virtual FCF has a virtual domain identifier (Domain_ID) X and a MAC address (FCF-MAC) Y.

As noted above, the FCFs 10A, 10B communicate with one another over two or more links (vPC peer links) 46. The links 46 may be used to synchronize state between the two FCFs 10 and to identify a failure in the other FCF.

Figure 4:
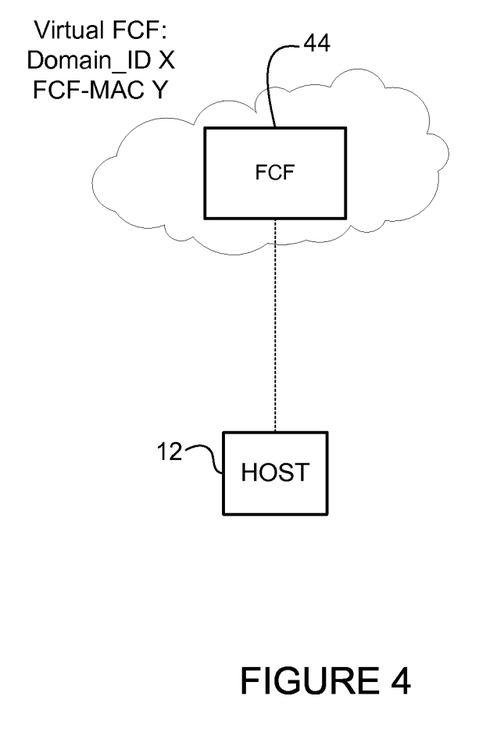
FIG. 4 illustrates a logical configuration of FIG. 3.

In one embodiment, on vPC ports, VN_Port to VF_Port virtual links are established by ENode MACs with the virtual FCF-MAC (e.g., Y in FIG. 3) and N_Port_IDs are assigned to VN_Ports from the virtual Domain_ID (X in FIG. 3). This results in a logical topology as shown in FIG. 4. FIG. 4 illustrates the logical configuration that the ENodes see for the vPC 16.

On non-vPC ports, VN_Port to VF_Port virtual links are established by ENode MACs with the FCF-MAC of the physical FCF (e.g., MAC(A) in FIG. 3) and N_Port_IDs are assigned to VN_Ports from the Domain_ID assigned to that FCF (e.g., A in FIG. 3).

FSPF (Fabric Shortest Path First) protocol is used to build routing tables for each of the FCFs 10 (and switches of the Fibre Channel Fabric). Each FCF periodically announces its presence to all of its immediate neighbor FCFs. Based on the announcements received from the neighbor FCFs, FSPF is able to recognize the Domain_IDs of the adjacent FCFs. Each FCF encodes this information in a Link State Record (LSR). The LSR is a table generated by each FCF, including the Domain_ID of the generating FCF and a list of the Domain_IDs of the adjacent FCFs, together with the cost of the links through which reach the Domain_IDs. FSPF computes paths with the minimal cost as the best paths for communications across the fabric. Once an LSR is constructed, it is flooded across the fabric. Each FSF of the fabric announces its presence by flooding its LSR, describing the topology of its neighbors in the fabric.

As previously described, the virtual FCF 44 is instantiated by the primary physical FCFs (FIG. 3). One of the two FCFs operates as a primary FCF and the other operates as a secondary FCF. Election of the primary FCF may be performed based on addresses or any other criteria. The primary FCF 10A advertises the FCF-MAC of the virtual FCF 44 to the ENodes 12 on vPC ports. The primary FCF 10A obtains from the principal switch of the fabric an additional Domain_ID to be used as the virtual Domain_ID for the virtual FCF and from which to allocate N_Port_IDs to ENodes on vPC ports. The primary FCF 10A generates the FSPF LSR for the virtual Domain_ID in the FSPF database, describing the virtual Domain_ID X as directly connected to the Domain_IDs of the two physical FCFs, A and B. The two physical FCFs 10A and 10B also lists in their own LSRs the virtual Domain_ID X as directly connected to each of them. The primary FCF 10A may also handle name server registrations, and RSCNs (Registered State Change Notifications) on behalf of the Virtual Domain_ID. The secondary FCF 10B maintains its state synchronized with the primary FCF 10A so that it can take over in case of a failure of the primary FCF. This allows the FCF-MAC Y and the Domain_ID X of the virtual FCF 44 to 'float' between the two physical FCFs 10A, 10B.

Figure 5:
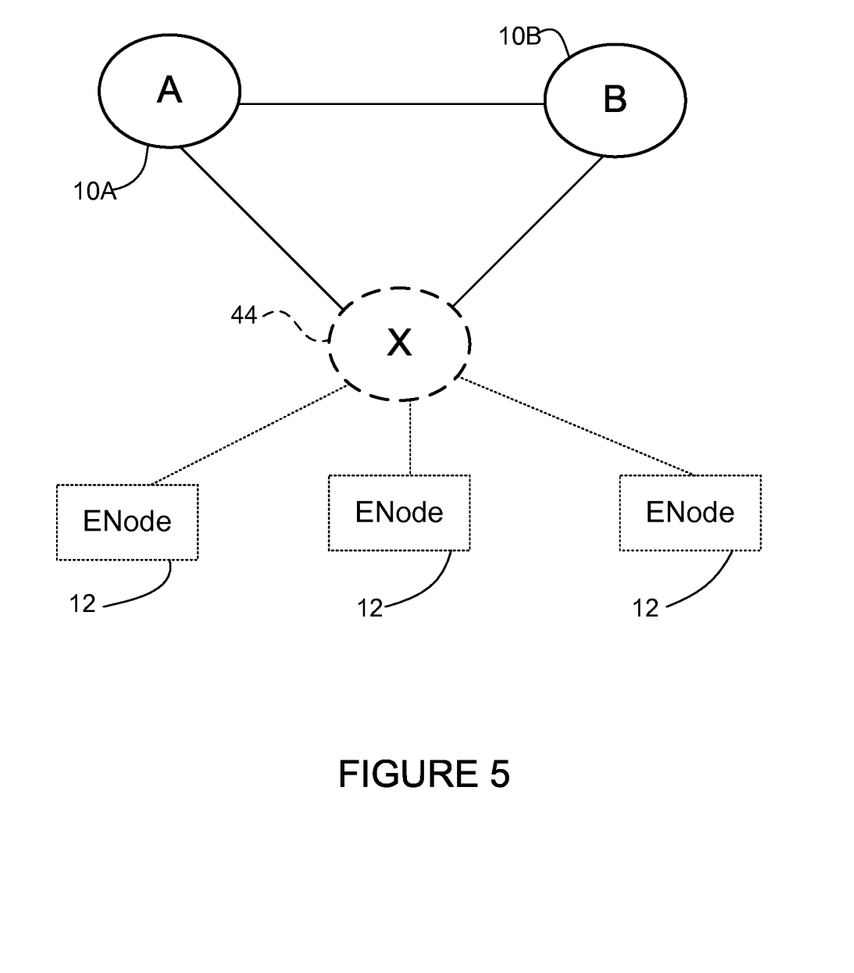
FIG. 5 illustrates an equivalent FSPF topology for the virtual FCF of FIG. 3.

As described above, Fibre Channel forwarding supports additional addressing domains (virtual Domain_ID). The primary FCF 10A generates the FSPF LSR representing the virtual Domain_ID, describing it as connected to both the primary FCF 10A and secondary FCF 10B. Primary and secondary FCFs 10A, 10B include a link to the virtual Domain_ID in their own FSPF LSRs. This results in an equivalent FSPF topology as shown in FIG. 5.

Figure 6:
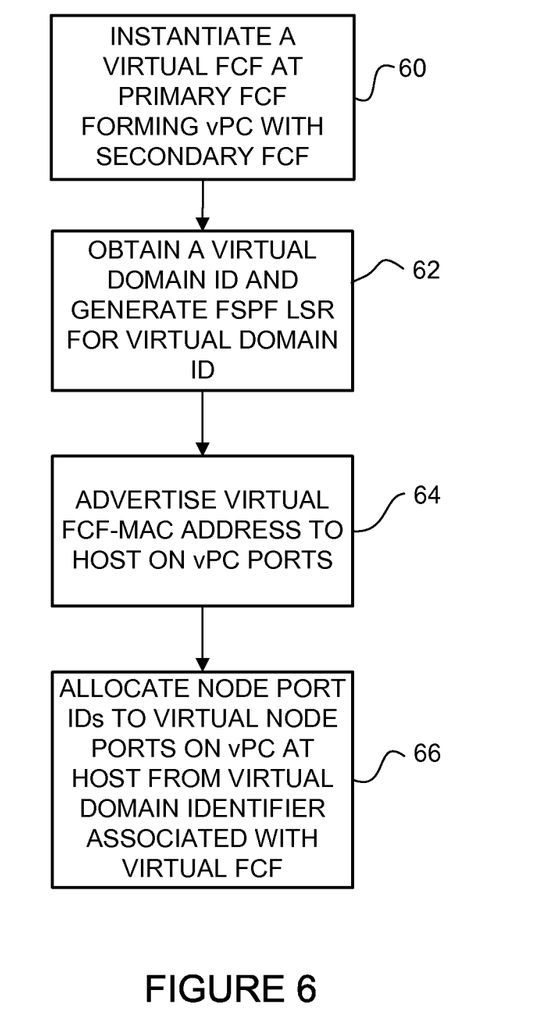
FIG. 6 is a flowchart illustrating a process for implementing FCoE over vPC, in accordance with one embodiment.

FIG. 6 is a flowchart illustrating a process for implementing FCoE over vPC, in accordance with one embodiment. At step 60, primary FCF 10A instantiates virtual FCF 44 (FIGS. 3 and 6). The virtual FCF 44 is associated with a virtual domain identifier (Domain_ID) and a virtual FCF address (FCF-MAC). The primary FCF 10A obtains a virtual Domain_ID from the principal switch and generates an FSPF LSR for the virtual Domain_ID in the fabric FSPF database (step 62). The primary FCF 10A and secondary FCF 10B form virtual Port Channel (vPC) 16. The primary FCF 10A advertises the virtual FCF address (FCF-MAC Y in FIG. 3) of virtual FCF 44 to the ENode 12 on vPC ports (step 64). The virtual Domain_ID is used to allocate node port identifiers (N_Port_IDs) to ENodes (host 12) on vPC ports (step 66). The primary FCF 10A also handles name server registrations and RSCNs on behalf of the virtual Domain_ID.

It is to be understood that the process illustrated in FIG. 6 is only an example and that steps may be added, deleted, or modified, without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    instantiating a virtual Fibre Channel over Ethernet (FCoE) Forwarder (FCF) at a primary FCF, the virtual FCF associated with a virtual domain identifier and a virtual FCF-MAC (Media Access Control) address, wherein the primary FCF and a secondary FCF share said virtual domain identifier and said virtual FCF-MAC and form a virtual Port Channel (vPC) for communication with a host;
    advertising said virtual FCF-MAC address to the host; and
    allocating node port identifiers to virtual node ports on vPC ports at the host from the virtual domain identifier;
    wherein said virtual domain identifier and said virtual FCF-MAC are utilized by the primary FCF and the secondary FCF in said communication with the host over said vPC and wherein said virtual FCF-MAC is utilized for FCoE Initialization Protocol (FIP) operations over said vPC.

2. The method of claim 1 wherein the primary FCF advertises the virtual FCF-MAC on said vPC ports.

3. The method of claim 1 further comprising generating an FSPF (Fabric Shortest Path First) LSR (Link State Record) for the virtual domain identifier.

4. The method of claim 1 further comprising synchronizing state with the secondary FCF.

5. The method of claim 1 further comprising performing name server registrations for the virtual domain identifier at the primary FCF.

6. The method of claim 1 further comprising performing RSCNs (Registered State Change Notifications) for the virtual domain identifier at the primary FCF.

7. The method of claim 1 further comprising assigning node port identifiers to virtual node ports at the host that are not associated with the vPC from a domain identifier assigned to the primary FCF or to the secondary FCF, based on where the host is connected.

8. The method of claim 1 wherein the virtual domain identifier is obtained from a principal switch in a fabric of the primary FCF.

9. The method of claim 1 further comprising establishing VN_Port to VF_Port virtual links by the host with said virtual FCF-MAC address on the vPC ports.

10. An apparatus comprising:
    a processor for instantiating a virtual Fibre Channel over Ethernet (FCoE) Forwarder (FCF) at a primary FCF, the virtual FCF associated with a virtual domain identifier and a virtual FCF-MAC (Media Access Control) address, the primary FCF configured to form a virtual Port Channel (vPC) with a secondary FCF for communication with a host, advertising said virtual FCF-MAC address to the host, and allocating node port identifiers to virtual node ports on vPC ports at the host from the virtual domain identifier; and
    memory for storing said identifiers;
    wherein said virtual domain identifier and said virtual FCF-MAC are utilized by the primary FCF and the secondary FCF in said communication with the host over said vPC and wherein said virtual FCF-MAC is utilized for FCoE Initialization Protocol (FIP) operations over said vPC.

11. The apparatus of claim 10 wherein the processor is further operable to generate an FSPF (Fabric Shortest Path First) LSR (Link State Record) for the virtual domain identifier.

12. The apparatus of claim 10 wherein the processor is further operable to synchronize state with the secondary FCF.

13. The apparatus of claim 10 wherein the processor is further operable to perform name server registrations for the virtual domain identifier.

14. The apparatus of claim 10 wherein the processor is further operable to perform RSCNs (Registered State Change Notifications) for the virtual domain identifier.

15. The apparatus of claim 10 wherein the processor is further operable to assign node port identifiers to virtual node ports at the host that are not associated with the vPC from a domain identifier assigned to the primary FCF.

16. The apparatus of claim 10 wherein the virtual domain identifier is obtained from a principal switch in a fabric of the primary FCF.

17. The apparatus of claim 10 wherein the processor is further operable to advertise said virtual FCF-MAC address to the host.

18. The apparatus of claim 10 wherein VN_Port to VF_Port virtual links are established by the host with said virtual FCF-MAC address on the vPC ports.

19. Logic encoded on one or more non-transitory computer readable media for execution and when executed operable to:
    instantiate a virtual Fibre Channel over Ethernet (FCoE) Forwarder (FCF) at a primary FCF, the virtual FCF associated with a virtual domain identifier and a virtual FCF-MAC (Media Access Control) address, wherein the primary FCF and a secondary FCF share said virtual domain identifier and said virtual FCF-MAC and form a virtual Port Channel (vPC) for communication with a host;

advertise said virtual FCF-MAC address to the host; and allocate node port identifiers to virtual node ports on vPC ports at the host from the virtual domain identifier;

wherein said virtual domain identifier and said virtual FCF-MAC are utilized by the primary FCF and the secondary FCF in said communication with the host over said vPC and wherein said virtual FCF-MAC is utilized for FCoE Initialization Protocol (FIP) operations over said vPC.

20. The logic of claim 19 further comprising logic operable to generate an FSPF (Fabric Shortest Path First) LSR (Link State Record) for the virtual domain identifier.

* * * * *